United States Patent Office 3,501,560
Patented Mar. 17, 1970

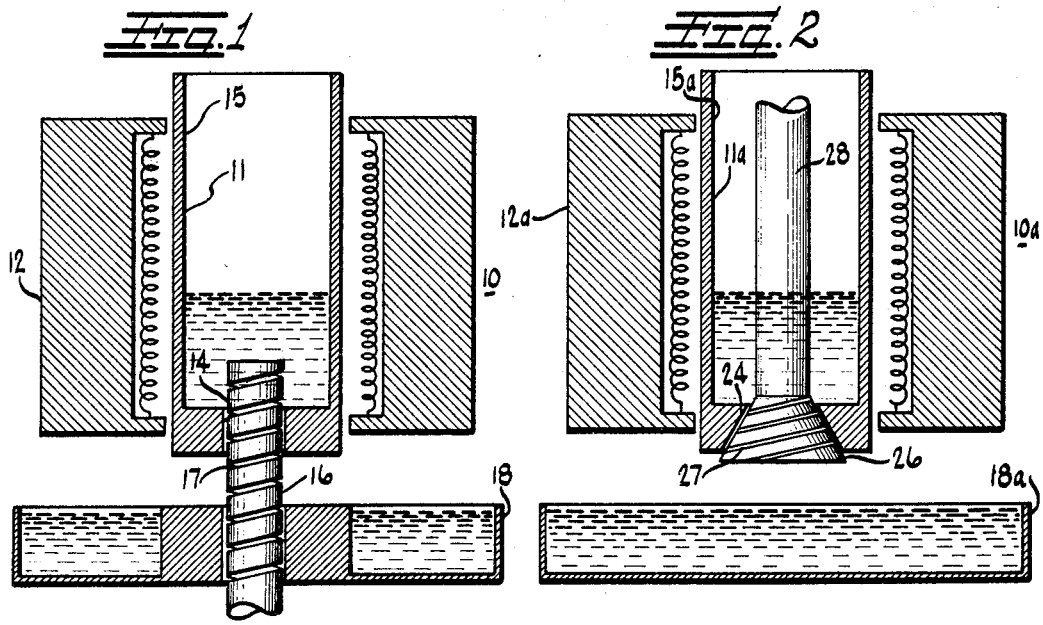
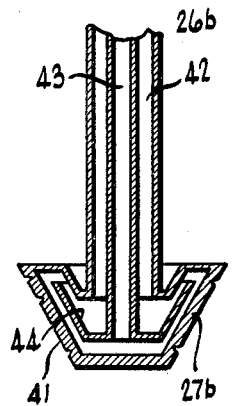
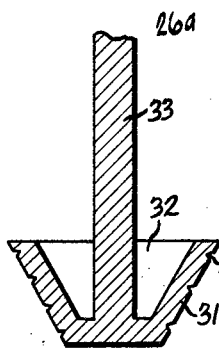
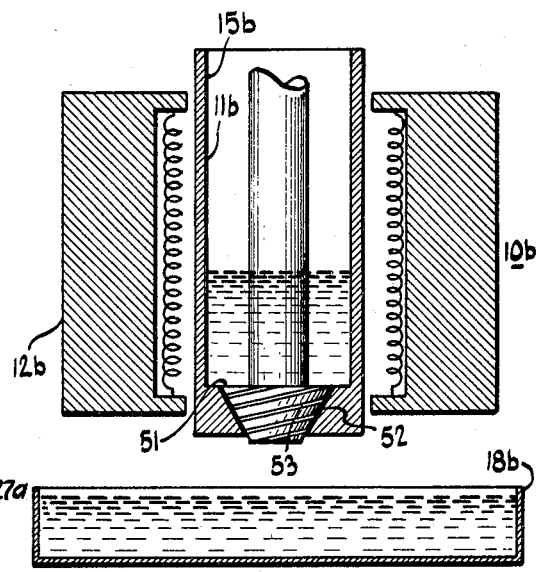
INVENTORS
MAURICE A. H. HOWES
HARRY SCHWARTZBART
ATTY

3,501,560
METHOD AND APPARATUS FOR PRODUCING FIBERS FROM MOLTEN METALS OR CERAMICS
Maurice A. H. Howes, Hinsdale, and Harry Schwartzbart, Evergreen Park, Ill., assignors to IIT Research Institute, Chicago, Ill., a not-for-profit corporation of Illinois
Filed Sept. 27, 1967, Ser. No. 675,741
Int. Cl. D01d 5/08; B28b 3/20
U.S. Cl. 264—85                                   17 Claims

ABSTRACT OF THE DISCLOSURE

A method and apparatus for producing fibers from the molten state. In the preferred embodiment the molten material traverses a clearance between a container and a spinning body inserted into an opening in the container. The spinning body is provided with grooves on its outer surface and the molten fibers form within these grooves and are thrown off by centrifugal force as they cool and solidify.

BACKGROUND OF THE INVENTION

This invention relates generally to a method and apparatus for producing fibers. More particularly it relates to a method and apparatus for producing fibers directly from the molten state. The invention finds particular application in the making of metal or ceramic fibers. These fibers are to be distinguished from glass or resinous materials. The making of metal or ceramic fibers involves many problems which are peculiar to these types of materials and which do not prevail in the making of glass or plastic fibers. Glass or plastic fibers can readily be made by existing methods and apparatus. On the contrary the making of metal or ceramic fibers involves problems of materials and temperatures peculiar to the metal or ceramic being operated upon. The temperatures necessary to make such fibers are significantly higher than those required for glass or plastic material. In addition, molten metals or ceramics have a much lower viscosity in the molten state than do glasses or plastics. Consequently, apparatus which is satisfactory for glass or plastic fiber making is not necessarily satisfactory for metal or ceramic manufacturing operations either in terms of design or materials employed. While the fibers in the following description may be referred to as metal, the term is employed for convenience only. Ceramic fibers such as borides are clearly within the scope of this invention.

One prior art method of making fibers consists of machining off strips of metal by mechanical attrition. Such mechanical forming involves the design of machinery or apparatus having sufficient strength properties and sufficient cutting tool life to make mass production of fibers economical. In addition the cost of stock material is high. As the demands of industry become greater, higher strength and harder fibers become desirable. The problems involved in the design of apparatus and the making of stock for this type of mechanical forming become increasingly severe as materials become more exotic.

Another prior art method of making metal fibers is hot extrusion through a porous plate. The metal is held in the molten or plastic state in a container the bottom of which is perforated by tiny holes. Pressure is applied to the upper surface of the molten metal and the fibers are formed much as spaghetti by being forced through the holes. The mechanical properties of such apparatus are not as critical as in the solid forming method described above. The high temperature properties of the plate and the tolerances and wear of the holes which are cut therein are more severe however. While a melt forming operation such as hot extrusion is superior to the mechanical forming described above, the design of the apparatus in the hot extrusion method involves problems of clogging and warping of the plate if any large volume is to be achieved. In addition there is the requirement that the metal be maintained at a particular temperature and pressure so that it will be in a plastic state as it is extruded through the pores of the plate.

Another method of melt forming of fibers involves projecting a stream of molten material from a nozzle through the atmosphere onto a spinning disc or dish. Upon impact the cooling stream is converted into continuous or discontinuous fibers depending on the angle speed and temperature. One disadvantage of this method lies in the splattering which takes place on impact with the spinning disc. A further disadvantage lies in the relatively low volume of production which can be achieved by a single nozzle and spinning disc. Thirdly, the cost of precision nozzles can be prohibitive for large volume fiber production.

There remains in the art a clear need for a rapid low cost means for producing quality fibers of high melting point materials generally classified as metals and ceramics at a high enough volume to be economically feasible.

SUMMARY OF THE INVENTION

The principal object of the present invention is to provide a new method and apparatus for producing fibers.

Another object of the present invention is to provide a low cost high volume method of producing fibers.

A further object of this invention is to provide a method and apparatus for producing quality fibers directly from a molten state.

A still further object of the present invention is to provide a method and apparatus for forming fibers from the molten state without employing a nozzle.

These and other objects of the present invention will be more clearly understood in connection wtih the preferred embodiments and by reference to the following detailed description in connection with the drawings, wherein:

FIGURE 1 is a vertical cross sectional view of one embodiment of the invention;

FIGURE 2 is a vertical cross section of a second embodiment of the invention;

FIGURE 3 is an enlarged cross sectional view of the spinner in FIGURE 2;

FIGURE 4 is a cross section of another spinner; and

FIGURE 5 is a vertical cross section of another embodiment of the invention.

Briefly, with reference to FIGURE 1, a preferred embodiment teaches an apparatus 10 for producing metal or ceramic fibers which apparatus includes a reservoir or container 11 for molten material and a heating means 12 to maintain the temperature of the material in the reservoir above the melting point. An opening 14 in the reservoir is fitted with a spinner 16 which extends into the reservoir. The spinner is provided with grooves 17 on its outer surface. The molten material is placed in the reservoir and maintained in a liquid condition. The force of gravity pulls the molten material into the grooves and the spinner rotates in such a manner that the molten material is drawn down through the opening and once clear of the opening the molten material is thrown free of the grooves.

A DESCRIPTION OF THE PREFERRED EMBODIMENTS

As described briefly above, in the embodiment shown in FIGURE 1, fiber making apparatus 10 includes a reservoir or vessel 11 for holding the molten material. The reservoir is of suitable design to hold a relatively large quantity of the molten material. The reservoir may be made of any suitable material depending on the type of material which it must contain. As shown in FIGURE 1 the walls 15 of the reservoirs are vertical; however they may be either vertical or sloped and as such form no part of the present invention. The reservoir is provided with an opening 14 in its bottom generally of a circular cross section. The opening functions to permit the liquid material a path of escape from the reservoir 11. While this opening 14 is shown in the bottom wall of reservoir 11, it could be located at any point below the surface of the molten metal.

In order that large volumes of liquid material might be maintained in the reservoir for production runs, a suitable furnace 12 is provided. The location and design of the furnace is not critical so long as an adequate temperature can be maintained.

The opening in the reservoir is partially obstructed by a spinner 16. The spinner is inserted into opening 14 and is also of a circular cross section. In FIGURE 1 the spinner is a right circular cylindrical rod of only slightly less diameter than the opening. The clearance between the outer surface of the spinner 16 and the walls of the opening 14 must be sufficient to prevent seizure at operating temperatures. At the same time the clearance must be small enough to confine most of the molten material in the grooves. Dimensions sufficient to satisfy these conditions are a function of the speed, temperature and material to be formed.

The spinner is provided with grooves 17 on the outer surface more clearly described hereinafter. These grooves may be provided in the form of one single start groove or as multiple start grooves. In operation these grooves function as paths for the molten metal to flow toward the outside of the reservoir 11 through the opening 14. The grooves are shown for convenience to be V-grooves and are made up of a first fully confined portion and a second portion which is a continuation of the first portion and is unconfined in the outward direction of the centrifugal force. Other groove cross sections such as semicircular or rectangular could be employed with equal results. The shape of the groove does not control the shape of the resulting fiber since the metal is thrown clear prior to solidification. The fiber will assume a generally circular cross section regardless of the shape of the groove. The spinner is driven by means not shown at a constant rotational speed suitable for the type and size of fibers desired. As in the case of the reservoir, the material employed for the spinner is dictated by the material to be formed into fibers and may be metal or other suitable material.

In the preferred mode of operation the molten metal of the desired composition is provided in the reservoir 11 and is maintained at the required temperature by the furnace 12. The spinner 16 rotates in the opening 14 in the direction which causes the start of each groove to bite into the molten material in the same manner as a drill. The rotation at a predetermined velocity causes the metal to be pulled along each groove in downward fashion. The flow is aided by gravity though additional pressure could be applied to the surface of the molten metal to increase flow. The metal is kept in the grooves by the walls of the opening 14. For this reason the wall containing the opening 14 must be of substantial thickness. Otherwise the molten material would not be confined to grooves 17 and no fibers would form. During the time required for the metal to pass to the bottom of the opening cooling occurs. Below the bottom of the opening the metal no longer has lateral restraint and is thrown clear by centrifugal force. A tank 18, which may be filled with a suitable quenching liquid, is employed to catch the fibers and permit further cooling. Solidification takes place after the fibers leave the grooves 17 and before they come to rest in the tank 18.

Referring to FIGURE 2 of the drawings, the parts of the apparatus including reservoir, furnace and collection tank which are of the same general configuration as in the device of FIGURE 1 will be referred to by the same number with the subscript a. The difference in this embodiment lies in the configuration of the opening. Opening 24 in the wall of the reservoir is in the form of a truncated cone. The smaller diameter as shown is at the inner surface of the reservoir and the larger diameter is at the outer surface.

Spinner 26 is also in the form of a truncated cone. The slope of the walls of the spinner and of the opening are compatible to give a constant clearance throughout the length of the spinner. The clearance between the walls of the opening and the outer surface of the spinner can be easily controlled by a vertical movement of the spinner. This ease of control provides one of the advantages of this configuration over the configuration of FIGURE 1. In the event of wear a new surface can be constructed on the spinner and a minor vertical adjustment can be made. This design also permits easier adjustment for differences in thermal expansion of the spinner and the opening. The angle of the cone on the spinner with the base of the spinner is shown in FIGURE 2 as 60°. The angle of the cone could in fact vary from 90° as shown in FIGURE 1 to approximately 30° depending on the fiber configuration desired. The spinner 26 is provided with grooves 27 cut into the outer surface in the form of a conical helix. Again, as in FIGURE 1, single lead or multiple lead grooves may be employed. The spinner 26 is shown with an upward projecting shaft 28. In such a configuration the driving means is located above the reservoir rather than below. This overhead drive configuration avoids problems of interference between the shaft and the fibers as they are formed and could be employed for making wire or filament.

The device shown in FIGURE 2 operates in essentially the same manner as the device shown in FIGURE 1. Obviously, for the same rotational velocity of the spinner a higher centrifugal force is generated in the device in FIGURE 2 by virtue of the larger diameter at the bottom of the spinner.

FIGURES 3 and 4 are cross sections of spinners which may be employed in the device of FIGURE 2 or 5. FIGURE 3 shows a spinner 26a having a frustoconical shape. The outer surface 31 has at least one groove 27a helically formed thereon. The underside is removed leaving an inner wall 32 opposing outer wall 31. Such removal affects the temperature gradient from top to bottom of spinner 26a. By proper design the temperature gradient can be controlled within satisfactory limits. Shaft 33 is shown protruding from the base of spinner 26a; however, it could extend from the top surface in the opposite direction if desired for a particular application.

If at higher temperatures more cooling is desired than is provided by the undercutting shown in FIGURE 3 a spinner such as the one shown in FIGURE 4 may be employed. In FIGURE 4 spinner 26b is constructed with internal cooling channels. Coolant is pumped into the spinner through outer passage 42 formed by a double tubular shaft. The coolant circulates through the spinner head cooling outer surface 41 and grooves 27b. Return tube 43 then removes the coolant from the spinner head. Inner portion 44 is connected to the head by flanges and the entire device turns as a unit.

In the embodiments of FIGURES 1 and 2 the shape of the spinner is best adapted to making relatively short fibers. With proper conditions, however, either device could be used for wire making. FIGURE 5 shows an embodiment of the apparatus particularly adapted for making continuous single or multiple strands. As above elements which are the same as in FIGURE 1 are shown with the subscript b. The difference in this embodiment again lies in the shape of the spinner 51 and the opening 52 in the reservoir 11b. Both the spinner 51 and opening 52 are again in the form of a truncated cone. The cone is inverted with the base at the top and the narrow portion at the bottom. Grooves 53 bite into the molten material and draw it downward. It is evident from the shape of this spinner that the highest velocity of any one groove during rotation will be at the top. Due to the lower velocity at the bottom there is less centrifugal force at the point of separation of the metal from the groove. All other parameters being properly adjusted to cause a slight compression of the metal in the groove, this configuration aids the formation of continuous filaments or wires rather than discontinuous fibers.

A specific example of fiber making using the device of FIGURE 1 will serve to clarify the above description of the apparatus and methods employed in the present invention.

EXAMPLE

A spinner consisting of a one inch diameter shaft of stainless steel is employed. 6 start V-grooves of 0.20 inch depth and 90° angle of inclusion are helically placed on the outer surface at an angle equivalent to two turns per inch of length. The clearance between the shaft and the opening in the base of the reservoir is 0.0002 inch.

The molten metal consisting of 63–37 tin-lead alloy is maintained at 400–450° F. in the reservoir. The shaft is rotated and fibers are collected in a tank surrounding the machine. Rotating the shaft at 1750 r.p.m. produces fibers of the order of 0.015–0.020 inch in diameter and ⅜ inch long.

Changing the speed of the shaft to 850 r.p.m. and keeping all other parameters constant produces fibers of 0.020–0.030 inch in diameter and $\frac{3}{16}$ inch long.

The previous example illustrates the effect of changing just one of the parameters on the resulting fibers. Increasing the speed of rotation produces fibers of greater length and smaller diameter. Speeds up to 10,000 r.p.m. or more are possible provided the spinner is properly supported. Fiber characteristics may be varied by raising or lowering the temperature in the reservoir. If rough noncircular fibers are desired the temperature can be lowered so that solidification begins before the fiber is free of the groove. In the usual mode of operation however, the temperature is sufficiently high that the fibers are thrown free of the spinner before solidification. Surface tension then erases the shape of the groove and causes the fibers to assume roughly a circular cross section.

It is possible to raise the temperature of the reservoir sufficiently to form fibers with smaller grooves. A point is reached where the molten material will not flow through the grooves of its own volition regardless of temperature. It is still possible to make fibers with such a small groove by subjecting the surface of the molten material to a pressure greater than atmospheric pressure. In addition, the productivity of any size grooves may be increased by operation at a reservoir pressure higher than atmospheric pressure.

Production may also be increased by using multiple lead grooves rather than a single lead. The pitch or helix angle of the grooves with respect to the base of the spinner may vary from a small angle approaching zero degrees to a very large angle approaching 90°. In order for the device to be effective, the grooves should take some bite at the top of the spinner. Consequently a helix angle of 90°, i.e., parallel to the spinner axis in FIGURE 1 is not normally desirable. While the pitch has been described as a helix, it need not be constant for the device to function. A variable pitch spinner may be desirable for certain applications. Production may also be increased by the use of multiple spinners in the base of a single reservoir.

While operating on certain materials the fibers formed may be severely impaired by oxidation. For this reason it is contemplated that this device may be operated in a nonoxidizing atmosphere such as argon to prevent scale from forming on the hot fibers or on the surface of the liquid.

By varying the parameters listed above it is possible to alter the characteristics of the fibers manufactured. Fibers can be made throughout the range from shot to continuous filaments. All of this range of size is possible without the use of a series of costly nozzles.

While preferred embodiments have been shown in the drawings and described herein these embodiments are not intended to cover all modifications and alternative constructions coming within the spirit and scope of the invention as defined in the appended claims.

We claim as our invention:
1. A method of producing fibers comprising:
   providing molten material selected from the group consisting of metals and ceramics in a reservoir;
   providing at least one predetermined helical path for drawing said molten material from the reservoir, said path having a first fully confined portion defined between a spinner having an essentially vertical axis located in an opening in said reservoir and the wall of said opening and a second portion spaced from said axis, said second portion being a continuation of said first portion;
   controlling the clearance between said spinner and said wall of said opening to provide an effective seal except for said path;
   drawing off said molten material from the reservoir first through said first portion and then through said second portion while permitting cooling of said drawn off material in said path;
   imparting a circular motion to said path about said axis, causing said molten material to move through said opening along said path, said circular motion creating centrifugal force on said material;
   said second portion of said path being unconfined in the direction of said centrifugal force;
   said centrifugal force causing said material to be thrown from said second portion of said path in the form of fibers after being drawn beyond said first fully confined portion of said path; and
   allowing said fibers to fall freely and solidify.
2. A method of producing fibers as defined in claim 1 wherein said material is permitted to cool to a plastic state before being thrown from said second portion.
3. The method defined in claim 1 wherein said fibers are further cooled by falling into a liquid.
4. The method defined in claim 1 wherein the method is performed in an oxygen free atmosphere.
5. The method defined in claim 4 wherein the atmosphere is argon.
6. The method defined in claim 1 wherein the pressure at the surface of said reservoir is higher than atmospheric pressure.
7. The method defined in claim 1 wherein said motion consists of rotation at a constant angular velocity.
8. The method defined in claim 1 wherein said predetermined path of flow describes a cylindrical helix.
9. The method defined in claim 1 wherein said predetermined path of flow describes a conical helix.
10. Apparatus for producing fibers selected from the group consisting of metals and ceramics comprising:
    a reservoir for holding molten material selected from the group consisting of metal and ceramic;
    said reservoir having a bottom wall;
    an opening in said bottom wall for drawing off molten material;
    a spinner located in and conforming to said opening to restrict the flow of molten material, said spinner and said opening having a common vertical axis of symmetry;
    at least one groove located on the outer surface of said spinner, the combination of the opening and said groove providing a flow path for drawing off molten material, the remainder of the outer surface of said spinner forming an effective seal in said opening;

said spinner and said groove extending beyond said reservoir wall; and means for rotating said spinner in said opening whereby molten material is drawn into said groove and cooled while flowing away from said reservoir to form fibers which are thrown clear by centrifugal force at the portion of said groove which extends beyond said wall.

11. Apparatus as defined in claim 10 further comprising means for applying heat to said reservoir so that said material remains in the molten state.

12. Apparatus as defined in claim 10 wherein said reservoir and the surface of said spinner are made of refractory material.

13. Apparatus as defined in claim 10 wherein said outer surface of said spinner is cylindrical and wherein said opening is cylindrical.

14. Apparatus as defined in claim 10 wherein said outer surface of said spinner is a truncated cone.

15. Apparatus as defined in claim 10 wherein said groove on the outer surface of said spinner is helical.

16. Apparatus as defined in claim 10 including cooling means within said spinner.

17. Apparatus as defined in claim 10 wherein multiple lead grooves are formed on said spinner.

References Cited

UNITED STATES PATENTS

| | | | |
|---|---|---|---|
| 1,224,815 | 5/1917 | Walters | 65—15 |
| 2,477,030 | 7/1949 | Wuetig | 164—84 |
| 2,994,915 | 8/1961 | Duncan | 65—15 |
| 1,824,482 | 9/1931 | Hartmann | 264—167 |
| 2,073,271 | 3/1937 | Webb. | |
| 2,149,066 | 2/1939 | Orsini. | |
| 2,174,779 | 10/1939 | Delorme | 264—75 X |
| 2,199,425 | 5/1940 | Waring | 264—103 X |
| 2,479,261 | 8/1949 | Retz | 264—75 |
| 2,566,846 | 9/1951 | Martin. | |
| 2,857,624 | 10/1958 | Hanzel et al. | 264—177 X |
| 3,080,736 | 3/1963 | Mabru et al. | |
| 3,102,717 | 9/1963 | Frenkel. | |
| 3,291,879 | 12/1966 | Martin | 264—167 |
| 3,329,998 | 7/1967 | Stohr. | |
| 3,387,069 | 6/1967 | Stohr. | |

JULIUS FROME, Primary Examiner

J. H. MILLER, Assistant Examiner

U.S. Cl. X.R.

18—2.5, 8; 65—1, 15, 302; 164—82, 84, 273, 283; 264—8, 176, 178, 212, 310